Aug. 21. 1928.  
G. B. ABER  
1,681,454  
ROTARY GAS ENGINE  
Filed Sept. 14, 1927  6 Sheets-Sheet 6

Inventor  
George B. Aber  
By *Clarence A. O'Brien*  
Attorney

Patented Aug. 21, 1928.

1,681,454

UNITED STATES PATENT OFFICE.

GEORGE BURTON ABER, OF CRANBERRY LAKE, NEW YORK.

ROTARY GAS ENGINE.

Application filed September 14, 1927. Serial No. 219,459.

The present invention relates to certain new and useful improvements in a rotary gas engine of the internal combustion type and has for its prime object the provision of an engine in which the rotor and cylinders serve as the balance wheel for the engine as they rotate together within a stationary casing.

Another very important object of the invention resides in the provision of a simple and efficient form of internal combustion engine of the character stated in which the crank case and cylinders rotate as a unit within a stationary casing and around a crank shaft in the opposite direction from the crank shaft and at a different rate of speed from the latter during the operation of the engine.

A still further important object of the invention resides in the provision of a rotary gas engine of this nature in which the crank casing and cylinders rotate in bearings on head plates which are fastened to a stationary casing, the crank case rotating in bearings on head plates which are connected to the crank casing.

Another very important object of the invention resides in the provision of a rotary gas engine of the character set forth in which the fuel gas is admitted to the crank case by means of one hollow end of the crank shaft and then to the cylinders from the crank case exhausting from the cylinders into an exhaust chamber.

A still further important object of the invention resides in the provision of a fan on the crank shaft rotatable in the exhaust chamber for exhausting the burnt gases to the atmosphere.

A further important object of the invention resides in the provision of a rotary gas engine of the character stated in which the gearing that controls the revolving cylinders and crank shaft is situated within a gear chamber in which the gearing runs in oil.

Another important object of the invention resides in the provision of a rotary gas engine of the character set forth in which the stationary casing is provided with a plurality of openings to provide for free circulation of air around the crank case and cylinders to maintain the engine in a cool condition during operation, each of the cylinders carrying a spark plug for engagement with contact plates of a sparking mechanism carried in the openings of the casing.

Another very important object of the invention resides in the provision of an improved and simplified form of a rotary gas engine of the character set forth in which the sparking mechanism includes adjustable contact members whereby the firing of the combustible gases within the several cylinders may be advanced or retarded as desired.

A still further and equally important object of the invention resides in the provision of a rotary gas engine of this type wherein the parts are compactly and conveniently arranged and operate in a thoroughly efficient and reliable manner.

With the above and numerous other objects in view as will appear as the description proceeds, the invention resides in certain novel features of construction, and in the arrangement and combination of parts as will be hereinafter more fully described and claimed.

Figure 1:
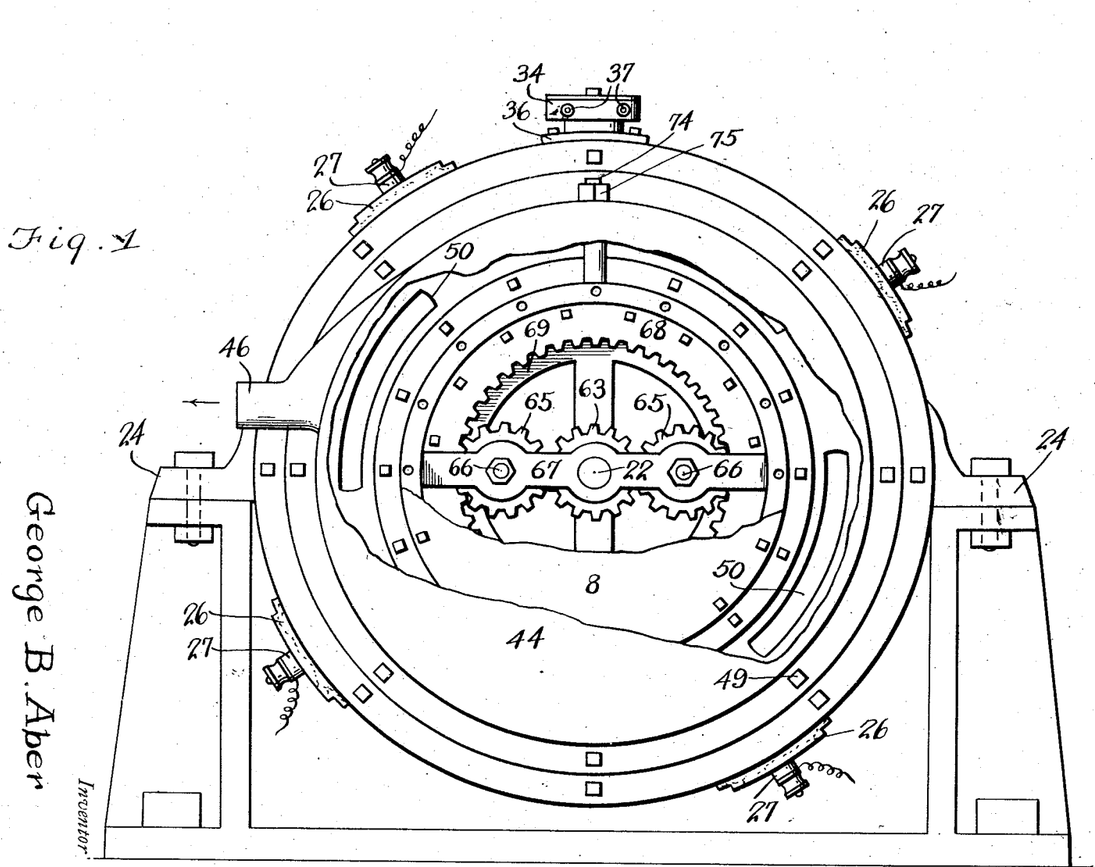
Figure 1 is an end elevation of the rotary gas engine embodying the features of my invention showing portions of the casing structure broken away to illustrate the gearing.
Figure 2:
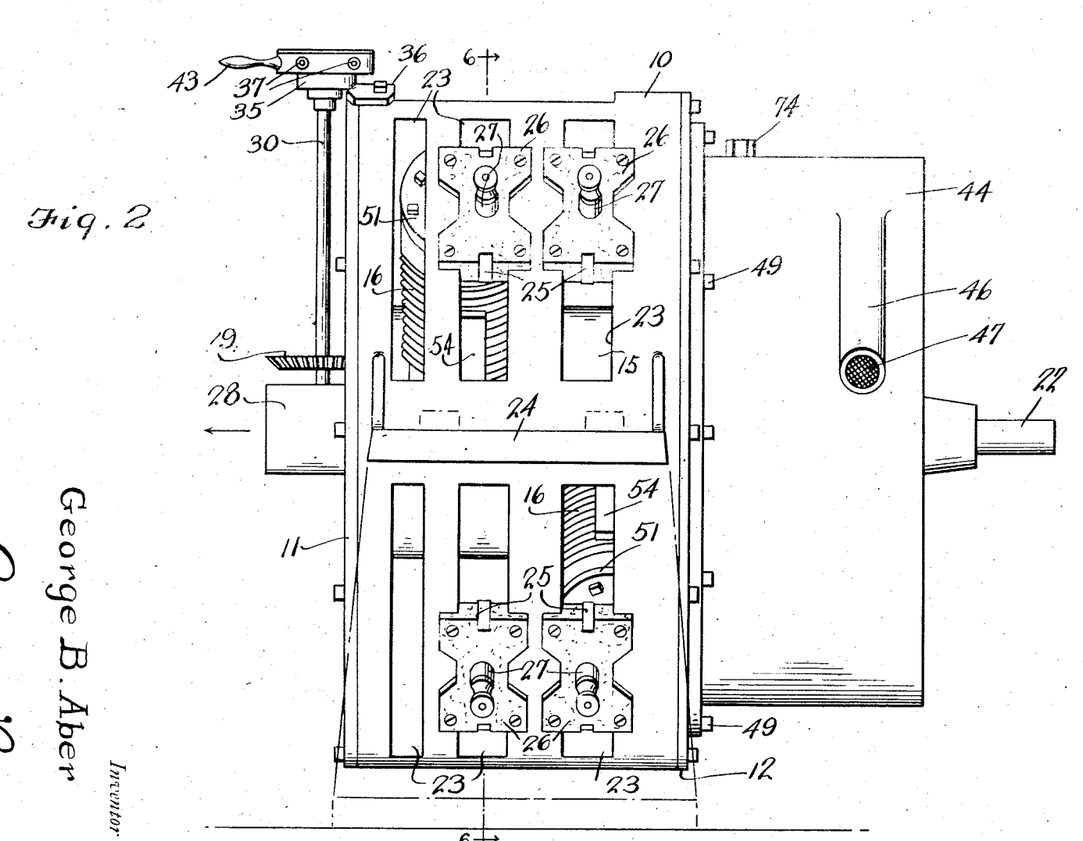
Figure 2 is a side elevation of the engine.
Figure 3:
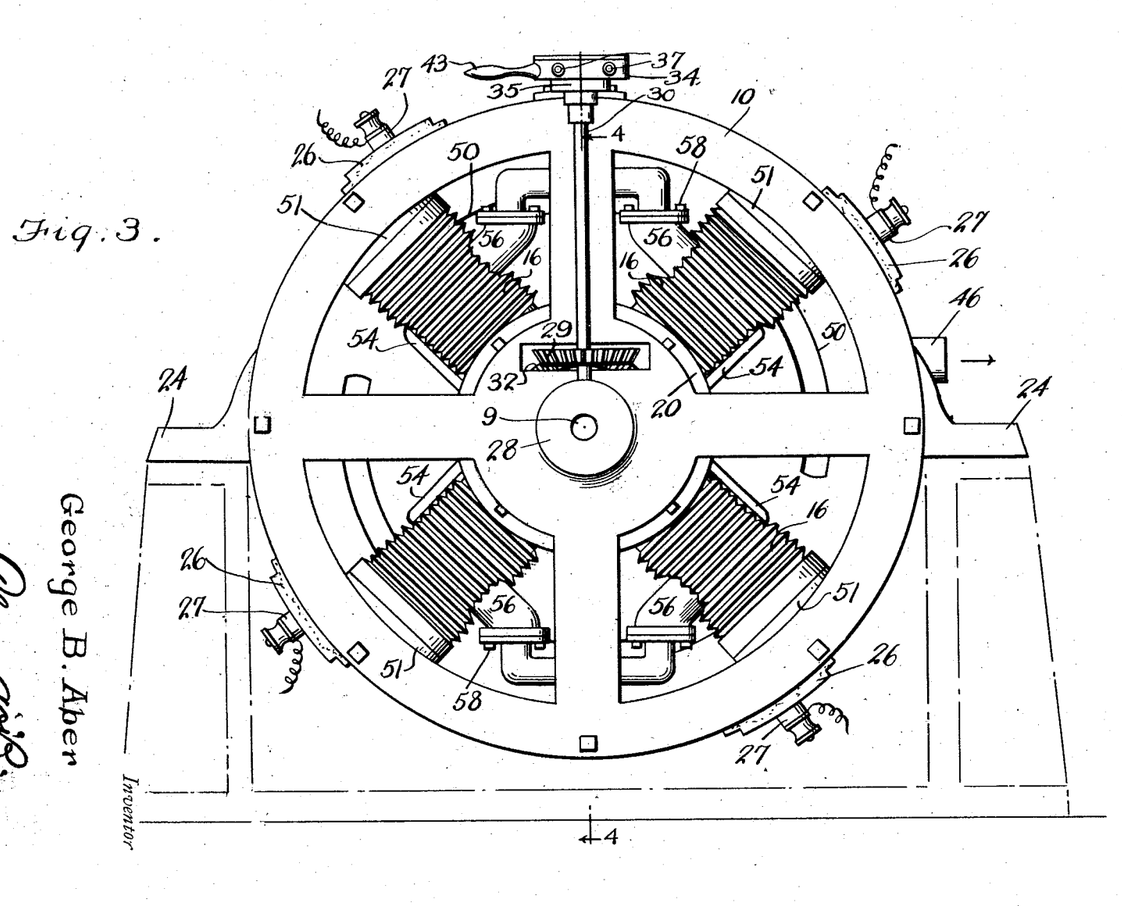
Figure 3 is another end elevation of the engine opposite to that shown in Figure 1 and having the head plate removed.
Figures 6, 7:
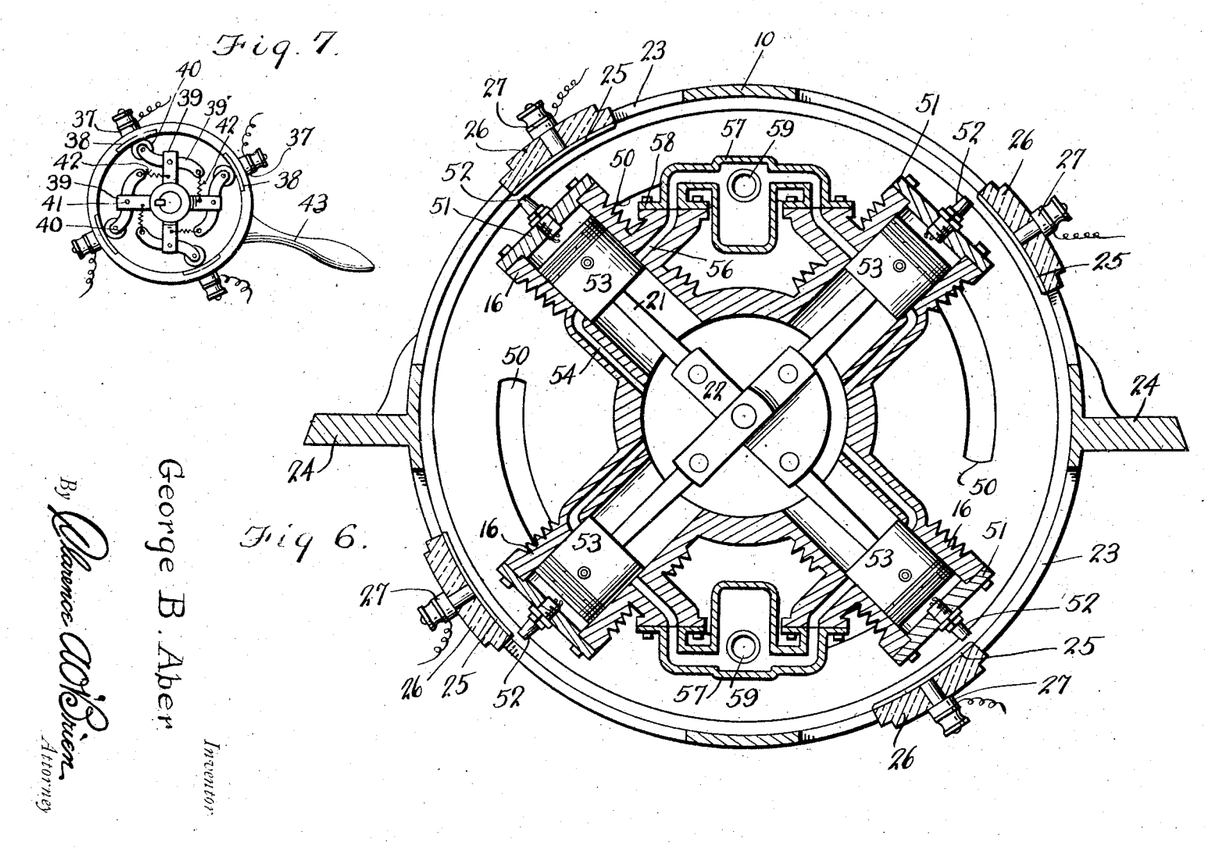
Figure 6 is a vertical transverse section taken substantially on the line 6—6 of Figure 2.
Figure 7 is a detail top plan view of the timer with the cover plate removed.

Referring to the drawings in detail, it will be seen that the engine includes a stationary casing 10 having a removable head 11 at one end and a removable head 12 at the other end. The heads 11 and 12 have central bearings 13 and 14 in which a crank casing 15 and cylinder blocks 16 are rotatably mounted by means of hollow axles 17 and 18. These axles 17 and 18 are mounted on removable heads 19 and 20 of the crank case 15. A crank shaft 22 rotates in the hollow axles 17 and 18 in the opposite direction from the crank case 15 and the cylinders 16. In Figures 2 and 6 it will be noted that the stationary casing 10 has a plurality of slots 23 to provide for a free circulation of air to maintain the engine in a cooled condition while in operation. A pair of flanges 24 extend radially in opposite directions from the casing 10 to provide for firm mounting of the casing 10 on a suitable supporting structure. In Figures 2 and 6 it will be seen that contact plates 25 are carried on the inner faces of insulated blocks 26. These blocks 26 are secured in the elongated openings or slots 23 in the casing 10. Binding posts 27 extend through the insulated blocks 26 and are connected with the contact plates 25. The head 11 of the casing 10 has an outwardly extending hub 28. A shaft 30 is provided with a beveled gear 29 thereon. This shaft 30 is journaled at its lower end in the hub 28 as at 31. A second beveled gear 32 is carried on the axle 18 as at 33. It will be seen that when the crank case 15 and the cylinders 16 rotate, rotary motion will be imparted by the two bevel gears 32 and 29 to the shaft 30. A timing device 34 is firmly mounted on the casing 10 by means of a bracket 35 which is attached to said casing as at 36. At 37 there are provided binding posts which are insulated and mounted on the timer 34 and are connected to a steel plate 38 as at 39 through four projecting arms which are keyed and mounted on the end of the shaft 30.

At 40 there are steel rollers which are attached to the projecting arms 39. The rollers 40 are journaled in the ends of arms 39' which are rockable as at 41 on the arms 39 and springs 42 are engaged with the arms 39' to extend the rollers outwardly into engagement into the interior of the timer casing and the contacts 38. The timer 34 may be readily adjusted by moving the handle 43 to the right or left. The object of adjusting the timer 34 is to advance or retard the firing of the charges within the engine cylinders during the operation of the engine as may be found desirable or necessary from time to time.

Figure 4:
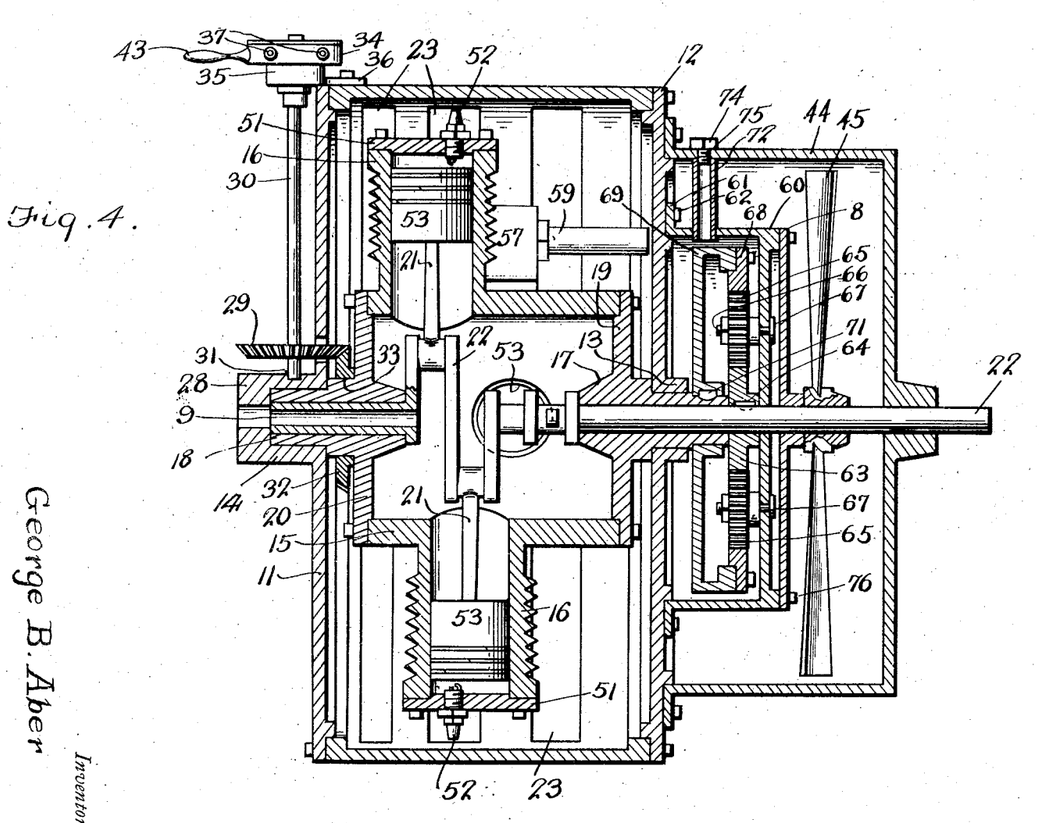
Figure 4 is a vertical longitudinal section taken substantially on the line 4—4 of Figure 3.
Figure 5:
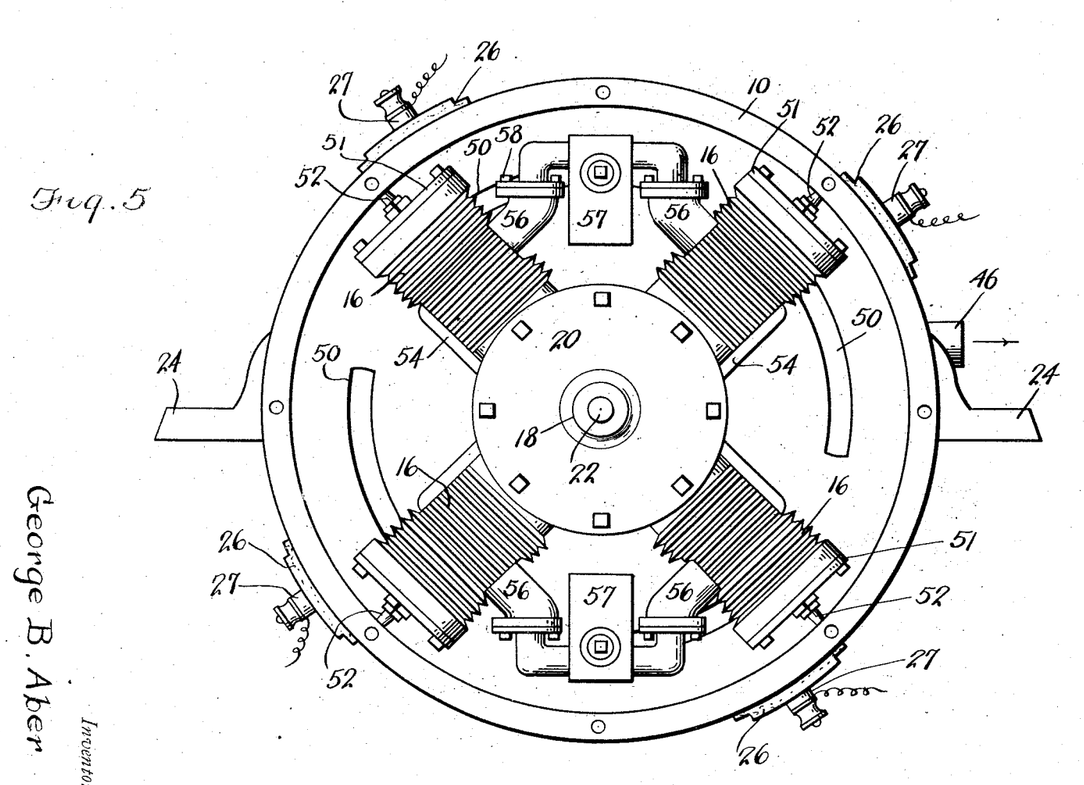
Figure 5 is an end elevation with the head plate and timing mechanism removed.

On the head 12 of the casing 10 there is mounted an exhaust chamber 44. A fan 45 is rotatable in the exhaust chamber 44 being fixed to the crank shaft 22. This exhaust chamber 44 is provided with a tangential discharge spout 46. A screen 47 is mounted in the outer end of the discharge spout 46 to exclude dust and foreign particles. This exhaust chamber 44 is provided with an annular flange 48 surrounding its open inner side through which securing bolts 49 extend to secure the exhaust chamber 44 in position upon the casing head 12. This casing head 12 is provided with a plurality of elongated arcuate exhaust discharge ports 50 extending therethrough and opening into the exhaust chamber 44. The outwardly radiating cylinders 16 are arranged in diametrically opposed pairs and the cylinders of each pair are offset as is apparent from an inspection of Figures 2 and 4. It will be seen that the pairs of cylinders are positioned in respect to each other at an angle of 90 degrees. These cylinders 16 have removable heads 51 provided on their outer ends and carrying appropriate spark plugs 52 which are adapted to electrically contact with the contact plate 25 as they pass across the same during the operation of the engine and at which time the circuits are completed through the spark plugs 52 to cause ignition and firing of the compressed gases within the respective cylinders. It is to be noted that these spark plugs do not actually engage the contact plates but move a slight distance therefrom as they move thereacross. The pistons 53 operate within the several cylinders 16 and are engaged with connecting rods 21 which are mounted in the usual manner on the crank portions of the crank shaft 22. The inner ends of the cylinders 16 open into the crank case 15 and this crank case 15 serves as the fuel feed chamber for the several cylinders 16, the fuel being supplied through the hollow end 9 of the crank shaft 22 which extends through the hollow axle 18 and runs in an appropriate bearings 14 and 13 in heads 11 and 12 of the outer stationary casing 10.

Each cylinder 16 has a fuel conducting tube 54 formed on one side thereof and opening at one end into the crank casing 15 while its opposite end is turned to terminate at the intake port 55. An exhaust port 56 is also provided on the opposite side of each cylinder 16 to communicate with the interior of the primary exhaust chamber 57 provided between the cylinders 16 in an arrangement clearly illustrated in Figure 6. The ends of the primary exhaust chambers 57 are turned so as to provide for proper connection of the removable exhaust chamber 57 with the exhaust sides of the engine cylinders 16. Each primary exhaust chamber 57 has a discharge pipe 59 extending from the side thereof in such a manner as to pass through the arcuate exhaust discharge ports 50 in the outer casing head 12 on each revolution of the crank shaft 22 and cylinders 16 within the stationary outer casing 10 whereby the burnt gases will be exhausted into the main exhaust chamber 44 and forced out of the same by the fan 45 by way of the tangential discharge spout 46. The inside of the exhaust chamber 44 has mounted therein a gear chamber 60 which is attached to the head 12 of the casing 10. The gear chamber 60 has a removable head 8 which is attached thereto as at 76. This gear chamber 60 is provided with an annular flange 61 surrounding its open inner side and through which the securing bolts 62 are attached to secure the gear chamber in position upon the casing head 12. On the crank shaft 22 inside of the gear chamber 60 there is rigidly mounted a gear 63 which is keyed at 64 to the crank shaft 22 and serves to drive intermediate gears 65 which are carried on stub shafts 66 mounted on the cross member 67. The intermediate gears 65 mesh with and drive the internal gear 68 which is mounted on a revolving disk 69 as at 70. This disc is rigidly mounted and keyed on the hollow axle 17 which is connected to the head 19 and fastened to the crank case 15. The gears 63, 65 and 68 are arranged so as to time the rotation of the parts connected therewith including the cylinder 16 and the crank case 15 with respect to the speed of rotation of the crank shaft 22. A three to one ratio is used. If the rotation of the cylinder 16 were one hundred revolutions per minute, the rotation of the crank shaft 22 would be three hundred revolutions per minute.

It will be further seen that a pipe 72 is attached to the gear chamber 60 as at 73. The gears 63, 65 and 68 run in oil being supplied to the gear chamber 60 through this pipe 72. At 74 there is attached a removable cap which is mounted on the exhaust chamber 44 at 75. When the cap 74 is removed, oil may be fed through the pipe 72 into the gear chamber 60. The four cylinders 16 and pistons 53 are at the point of high compression as they pass across the contact plates 25. The compressed gases are ignited and fired by the spark plugs 25 at which time the circuits are completed through the timing device 34 as the rollers 40 pass over the steel plates 38. As will be apparent from an inspection of Figure 6, all four of the cylinders 16 fire simultaneously so that for each complete cycle, crank shaft 22 makes three fourths of a revolution and cylinders 16 make one-fourth of a revolution. This is, of course equivalent to a travel of one-fourth of the circumference of the casing for cylinders 16. In making one complete revolution around the circumference of stationary casing 10, cylinder 16 will fire sixteen times and crank shaft 22 will make sixteen revolutions.

Particular attention is directed to the arrangement and construction of parts whereby the weight of the crank case and the cylinders do not rest upon the crank shaft 22 but are swung on the head plates 11 and 12 of the casing 10 where they rotate in the bearings 13 and 14 so that the shaft 22 is free to perform its intended function.

It is thought that the construction, utility, operation, and advantages of the invention will now be quite apparent to those skilled in this art without a more detailed description thereof. The present embodiment of the invention has been disclosed in detail merely by way of example since in actual practice it attains the features of advantage enumerated as desirable in the statement of the invention and the above description. It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:—

1. In an internal combustion engine, a stationary casing, a crank case rotatably mounted in the casing, a plurality of cylinders radiating outwardly from the crank case, pistons in the cylinders, a crank shaft rotatable in the crank case, connecting rods between the pistons and the crank shaft, said casing having a plurality of elongated slots to afford circulation of air in and out of the casing, gearing operatively connecting the crank case with the crank shaft to set up rotation of the crank shaft in one direction upon rotation of the crank case in an opposite direction, means for delivering a combustible mixture to the interior of the crank case, said cylinder being formed with conduits leading from the interior of the crank case to the intermediate portions of the cylinders, exhaust reservoirs in the casing, conduits leading from the cylinders to the reservoirs, an exhaust chamber on the casing and formed with an outlet, said shaft extending into the chamber, a fan on the shaft in the chamber, conduits leading from the reservoirs to the chamber, said fan drawing the burnt gases from the cylinders through the first exhaust conduits, through the reservoirs, through the second exhaust conduits into the chamber and exhausting the gases through the outlet, and ignition means associated with the cylinders.

2. In an internal combustion engine, a stationary casing, a crank case rotatably mounted in the casing, a plurality of cylinders radiating outwardly from the crank case, pistons in the cylinders, a crank shaft rotatable in the crank case, connecting rods between the pistons and the crank shaft, said casing having a plurality of elongated slots to afford circulation of air in and out of the casing, gearing operatively connecting the crank case with the crank shaft to set up rotation of the crank shaft in one direction upon rotation of the crank case in an opposite direction, means for delivering a combustible mixture to the interior of the crank case, said cylinder being formed with conduits leading from the interior of the crank case to the intermediate portions of the cylinders, exhaust reservoirs in the casing, conduits leading from the cylinders to the reservoirs, an exhaust chamber on the casing, a tangential outlet spout leading from the chamber, said shaft extending into the chamber, a centrifugal fan on the shaft for drawing the burnt gases from the cylinders and exhausting the gases through the tangential outlet spout, and ignition means associated with the cylinders.

3. In an internal combustion engine, a stationary casing, a crank case rotatably mounted in the casing, a plurality of cylinders radiating outwardly from the crank case, pistons in the cylinders, a crank shaft rotatable in the crank case, connecting rods between the pistons and the crank shaft, said casing having a plurality of elongated slots to afford circulation of air in and out of the casing, gearing operatively connecting the crank case with the crank shaft to set up rotation of the crank shaft in one direction upon rotation of the crank case in an opposite direction, means for delivering a combustible mixture to the interior of the crank case, said cylinder being formed with conduits leading from the interior of the crank case to the intermediate portions of the cylinders, exhaust reservoirs in the casing, conduits leading from the cylinders to the reservoirs, an exhaust chamber on the casing, a tangential outlet spout leading from the chamber, said shaft extending into the chamber, a centrifugal fan on the shaft for drawing the burnt gases from the cylinders and exhausting the gases through the tangential outlet spout, and ignition means associated with the cylinders, said casing having openings leading into the chamber so that the fan will also act to set up a cooling circulation in the casing.

4. In an internal combustion engine, a stationary casing, a crank case rotatably mounted in the casing, a plurality of cylinders radiating outwardly from the crank case, pistons in the cylinders, a crank shaft rotatable in the crank case, connecting rods between the pistons and the crank shaft, said casing having a plurality of elongated slots to afford circulation of air in and out of the casing, gearing operatively connecting the crank case with the crank shaft to set up rotation of the crank shaft in one direction upon rotation of the crank case in an opposite direction, means for delivering a combustible mixture to the interior of the crank case, said cylinder being formed with conduits leading from the interior of the crank case to the intermediate portions of the cylinders, exhaust reservoirs in the casing, conduits leading from the cylinders to the reservoirs, an exhaust chamber on the casing and formed with an outlet, said shaft extending into the chamber, a fan on the shaft in the chamber, conduits leading from the reservoirs to the chamber, said fan drawing the burnt gases from the cylinders through the first exhaust conduits, through the reservoirs, through the second exhaust conduits into the chamber and exhausting the gases through the outlet, and ignition means associated with the cylinders, said casing having openings leading into the chamber so that the fan will also set up a cooling circulation in the casing.

5. In an internal combustion engine, a stationary casing, a crank case rotatably mounted in the casing, a plurality of cylinders radiating outwardly from the crank case, pistons in the cylinders, a crank shaft rotatable in the casing and the crank case, connecting rods between the pistons and the shaft, means for delivering a combustible mixture to the interior of the crank case, said cylinder being formed with conduits leading from the interior of the crank case to the intermediate portions of the cylinders, exhaust reservoirs in the casing, conduits leading from the cylinders to the reservoirs, an exhaust chamber on the casing and formed with an outlet, said shaft extending into the chamber, a fan on the shaft in the chamber, conduits leading from the reservoir to the chamber, said fan drawing the burnt gases from the cylinders through the first exhaust conduits, through the reservoirs, through the second exhaust conduits into the chamber and exhausting the gases through the outlet and ignition means associated with the cylinders.

6. In an internal combustion engine, a stationary casing, a crank case rotatably mounted in the casing, a plurality of cylinders radiating outwardly from the crank case, pistons in the cylinders, a crank shaft rotatable in the casing and the crank case, connecting rods between the pistons and the shaft, means for delivering a combustible mixture to the interior of the crank case, said cylinders being formed with conduits leading from the interior of the crank case to the intermediate portions of the cylinders, exhaust reservoirs in the casing, conduits leading from the cylinders to the reservoirs, an exhaust chamber on the casing, a tangential outlet pipe leading from the chamber, said shaft extending into the chamber, a centrifugal fan on the shaft for exhausting the gases through the tangential outlet pipe.

7. In an internal combustion engine, a stationary casing, a crank case rotatably mounted in the casing, a plurality of cylinders radiating outwardly from the crank case, pistons in the cylinders, a crank shaft rotatable in the casing and the crank case, connecting rods between the pistons and the shaft, means for delivering a combustible mixture to the interior of the crank case, said cylinders being formed with conduits leading from the interior of the crank case to the intermediate portions of the cylinders, exhaust reservoirs in the casing, conduits leading from the cylinders to the reservoirs, means for sucking exhaust gases from the reservoirs and ignition means associated with the cylinders, said casing having openings leading into the chamber so that the fan will also set up a cooling circulation in the casing.

8. In an internal combustion engine, a stationary casing, a crank case rotatably mounted in the casing, a plurality of cylinders radiating outwardly from the crank case, pistons in the cylinders, a crank shaft rotatable in the casing and the crank case, connecting rods between the pistons and the shaft, means for delivering a combustible mixture to the interior of the crank case, said cylinder being formed with conduits leading from the interior of the crank case to the intermediate portions of the cylinders, exhaust reservoirs in the casing, conduits leading from the cylinders to the reservoirs, an exhaust chamber on the casing and formed with an outlet, said shaft extending into the chamber, a fan on the shaft in the chamber, conduits leading from the reservoir to the chamber, said fan drawing the burnt gases from the cylinders through the first exhaust conduits, through the reservoirs, through the second exhaust conduits into the chamber and exhausting the gases through the outlet and ignition means associated with the cylinders, said casing having openings leading into the chamber so that the fan will also set up a cooling circulation in the casing.

9. In an internal combustion engine, a stationary casing, a crank case having hollow axles journaled in the casing, a crank shaft journaled in the hollow axles, one end of the shaft being hollow to form a conduit for a combustible mixture into the casing, said cylinders being formed with conduits leading from the interior of the crank case to the intermediate portions of the cylinders, exhaust reservoirs in the casing, conduits leading from the cylinders to the reservoirs, an exhaust chamber on the casing and formed with an outlet, said shaft extending into the chamber, a fan on the shaft in the chamber, conduits leading from the reservoirs to the chamber, said fan drawing the burnt gases from the cylinders to the first exhaust conduits, through the reservoirs, through the second exhaust conduits, into the chamber and exhausting the gases through the outlet, and ignition means for the cylinders.

10. In an internal combustion engine, a stationary casing, a crank case having hollow axles journaled in the casing, a crank shaft journaled in the hollow axles, one end of the shaft being hollow to form a conduit for a combustible mixture into the casing, said cylinders being formed with conduits leading from the interior of the crank case to intermediate portions of the cylinders, exhaust reservoirs in the casing, conduits leading from the cylinders to the reservoirs, an exhaust chamber on the casing, a tangential outlet pipe leading from the chamber, said shaft extending into the chamber, a centrifugal fan on said shaft adapted to exhaust burnt gases from the chamber 11. In an internal combustion engine, a stationary casing, a crank casing having hollow axles journaled in the casing, a crank shaft journaled in the hollow axles, one end of the shaft being hollow to form a conduit for a combustible mixture into the casing, said cylinders being formed with conduits leading from the interior of the crank case to the intermediate portions of the cylinders, exhaust reservoirs in the casing, conduits leading from the cylinders to the reservoirs, means for sucking exhaust gases from the reservoirs, and ignition means associated with the cylinders, said casing having openings leading into the chamber so that the fans will also set up a cooling circulation in the casing.

12. In an internal combustion engine, a stationary casing, a crank case having hollow axles journaled in the casing, a crank shaft journaled in the hollow axles, one end of the shaft being hollow to form a conduit for a combustible mixture into the casing, said cylinders being formed with conduits leading from the interior of the crank case to the intermediate portions of the cylinders, exhaust reservoirs in the casing, conduits leading from the cylinders to the reservoirs, an exhaust chamber on the casing and formed with an outlet, said shaft extending into the chamber, a fan on the shaft in the chamber, conduits leading from the reservoirs to the chamber, said fan drawing the burnt gases from the cylinders to the first exhaust conduits, through the reservoirs, through the second exhaust conduits, into the chamber and exhausting the gases through the outlet, and ignition means for the cylinders, said casing having openings leading into the chamber so that the fan will also set up a cooling circulation in the casing.

In testimony whereof I affix my signature.

GEORGE BURTON ABER.